United States Patent
Ferrari

[19]
[11] Patent Number: 5,911,306
[45] Date of Patent: Jun. 15, 1999

[54] SECTIONAL ROLLER UNIT FOR CONVEYING LINES

[75] Inventor: Fabrizio Ferrari, Correggio, Italy

[73] Assignee: Rexnord Marbett SPA, Correggio, Italy

[21] Appl. No.: 08/763,787

[22] Filed: Dec. 11, 1996

[30] Foreign Application Priority Data

Feb. 1, 1996 [IT] Italy ................. RE960004 U

[51] Int. Cl.⁶ ............................................. B65G 21/20
[52] U.S. Cl. ............................. 198/836.1; 193/35 C
[58] Field of Search .......................... 193/35 C; 198/831, 198/836.1, 836.2, 836.3, 836.4, 853

[56] References Cited

U.S. PATENT DOCUMENTS

| | | | |
|---|---|---|---|
| 935,669 | 10/1909 | Logan ................................ | 193/35 C |
| 3,368,666 | 2/1968 | Stone ................................ | 198/836.1 |
| 4,640,056 | 2/1987 | Stump ............................. | 198/836.2 X |
| 4,962,843 | 10/1990 | Ouellette ............................. | 198/453 |
| 5,605,217 | 2/1997 | Risley et al. ..................... | 198/836.1 X |
| 5,735,378 | 4/1998 | Sundquist ........................ | 198/836.3 X |

*Primary Examiner*—James R. Bidwell

[57] ABSTRACT

A roller unit suitable for application to the side walls of chain link conveyors, including along their curved portions, and containing modules, each of which includes a flat plate, from the opposing sides of which there extends a first pair of brackets between which there are supported the fixing pins of the constituent idle rollers of the roller unit, and a second pair of brackets for receiving the conveyor side wall and the elements for fixing the module thereto, the second pair of brackets being provided with recesses which extend to also involve the plate.

6 Claims, 2 Drawing Sheets

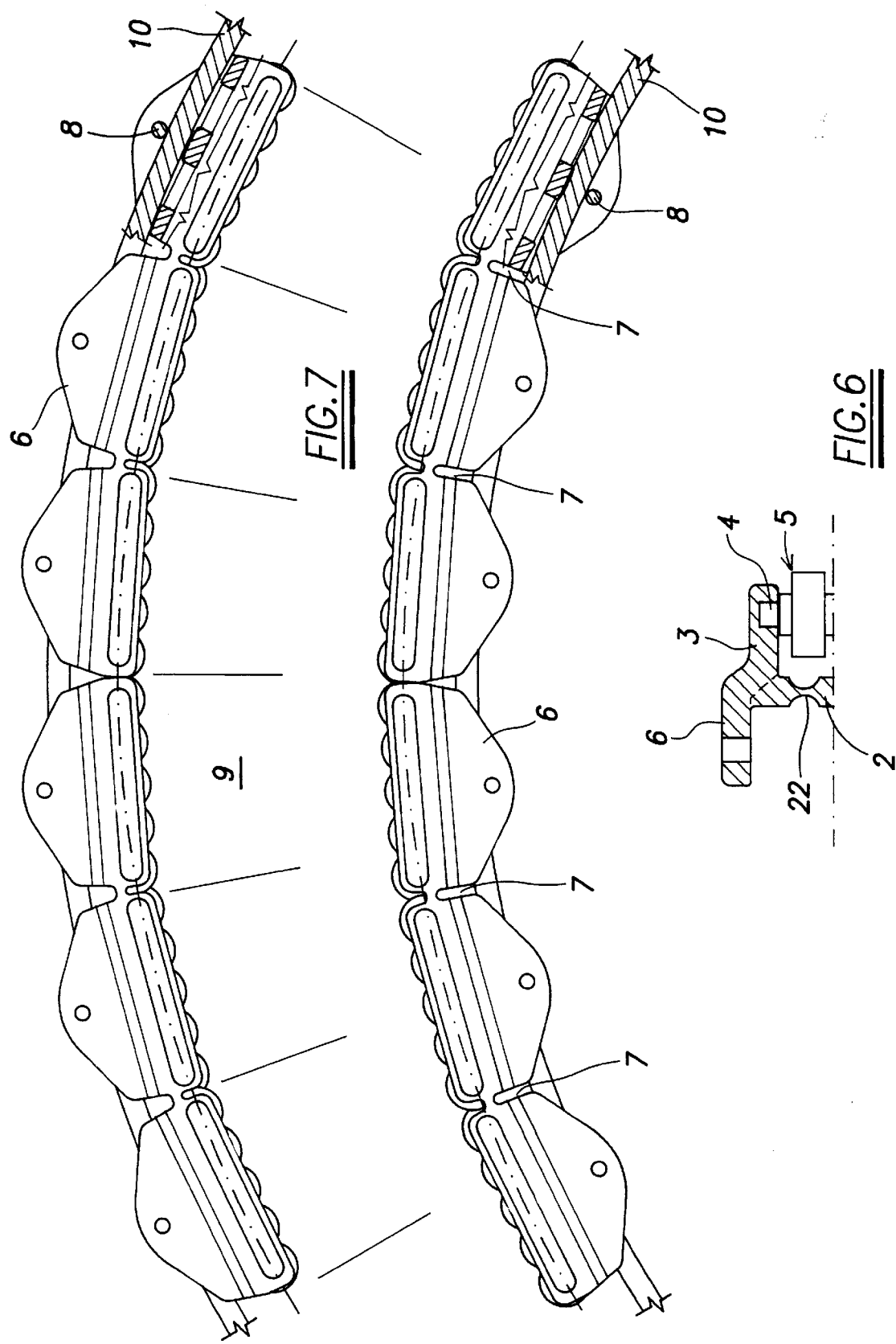

SECTIONAL ROLLER UNIT FOR CONVEYING LINES

BACKGROUND O THE INVENTION

Object conveying lines formed from chain conveyors, the links of which upperly comprise the support surface for the objects, have curved portions along which the conveyed objects must be guided laterally.

Roller units are known for this purpose, having their rollers of vertical axis and being applied to the conveyor side walls at least along the curved portions.

SUMMARY OF THE INVENTION

The present invention relates to the roller units, its object being to eliminate the difficulties inherent in known roller units with regard to their mounting, replacement and demounting on and from the conveyor side walls.

The present invention provides a roller unit composed of a succession of mutually identical modules comprising means enabling them to flex so that they adapt to the curved side wall of the conveyor, and means for their quick and easy fixing to said wall.

According to the present invention the module comprises a plate from which there branches a first pair of opposing brackets arranged to support the fixing pins of a series of idle slide rollers.

From the opposite side of the plate to that supporting said first brackets there branch second brackets arranged to receive the conveyor side wall and at least one peg which, when the invention is mounted on the conveyor side wall, maintains it locked to said wall.

The peg can be easily withdrawn to enable a single module to be mounted and demounted without involving the adjacent modules.

The brackets of said second pair comprise at least one V-shaped recess which also involves the plate, in correspondence with which the module can flex to adapt to the curved wall of the conveyor.

According to the present invention, the plate can also be in the form of interrupted portions and advantageously have a weakened longitudinal section to allow easy mounting of the roller fixing pins by diverging the brackets which support them.

BRIEF DESCRIPTION OF THE DRAWINGS

The merits and the operational and constructional characteristics of the invention will be apparent from the detailed description given hereinafter with reference to the figures of the accompanying drawings, in which:

FIG. 6 shows a particular form of the invention; and

FIG. 7 is a plan view of part of a conveyor provided with the invention.

Figure 3:
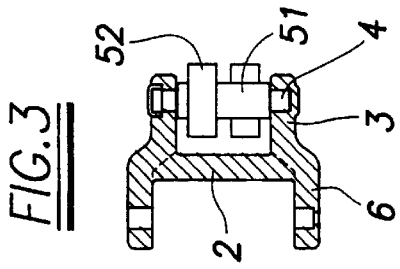
FIG. 3 is a section on the line III—III of FIG. 1.
Figure 1:
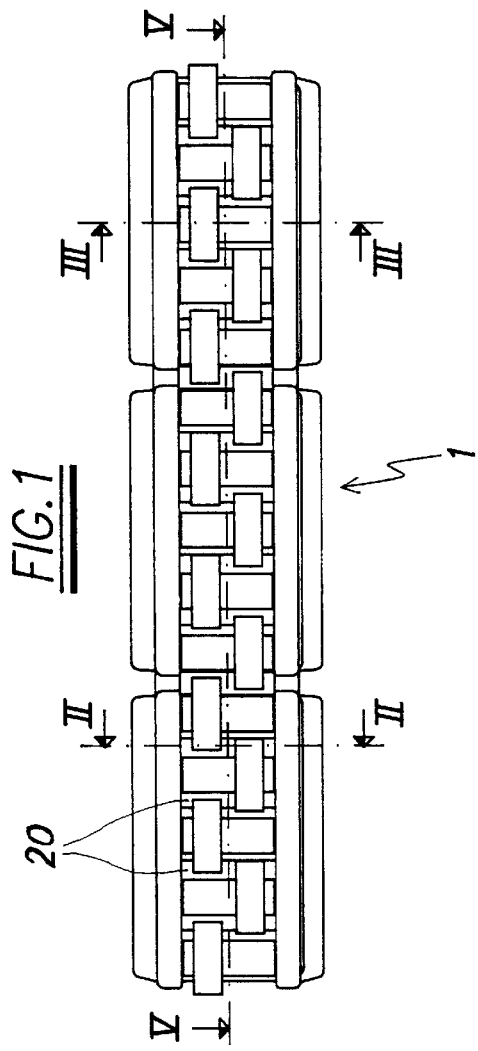
FIG. 1 is a side view of the invention.
Figure 2:
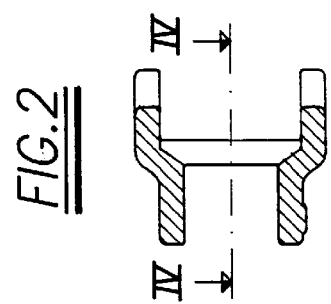
FIG. 2 is a section on the line II—II of FIG. 1.
Figure 5:
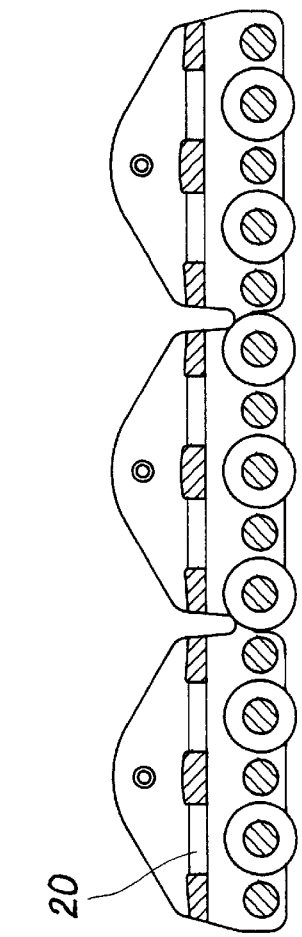
FIG. 5 is a plan view of the invention.
Figure 4:
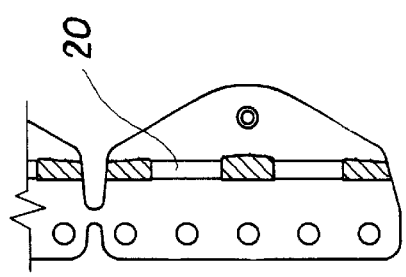
FIG. 4 is a section on the line IV—IV of FIG. 2.

The figures show a module 1 comprising a flat plate 2 from one side of which there branches a first pair of opposing brackets 3, between which the equidistant fixing pins 4 of idle running rollers 5 are supported.

Each roller comprises a hub 51 and a widened part 52 extending along less than one half of the roller length, so that on mounting the rollers alternately turned through 180°, their widened parts form the sliding roller unit for the objects concerned.

From the opposite side of the flat plate 2 there branches a second pair of brackets 6 each of which comprises two recesses 7 which extend into the plate 2, so dividing it into three parts.

Those plate parts not containing the recesses comprise interruptions 20 to improve plate flexibility.

Those portions of the brackets 6 separated by the recesses 7 each comprise a seat for the insertion of a peg 8 with an enlarged head, the purpose of which will be explained hereinafter.

The pins 4, generally of steel, are forced into corresponding holes provided in the brackets 3.

In a particular embodiment shown in FIG. 6, the plate 2 has a longitudinal weakening line 22 enabling it to undergo a small amount of flexure.

This enables the brackets 3 to be advantageously diverged to insert the pins 4 into suitable opposing dead seats, instead of inserting them from the outside into holes provided for this purpose in the brackets 3, as shown in the other figures.

The operation of the present invention is apparent from FIG. 7.

To the sides of the conveyor 9 there are provided two walls 10 of rectangular cross-section, formed from a rolled steel band.

The modules are arranged one after another on the inside of said side walls so that these latter are contained between the brackets 6.

The modules face each other, in the sense that the rollers 5 face the conveyor.

At this point each module is forced so that it adheres to the side wall, this being facilitated by the recesses 7 and interruptions 20, and is then locked in position by inserting the enlarged head pegs 8 into their respective seats.

A roller unit is hence formed which is continuous along the side walls.

The modules can also be applied to the rectilinear conveyor portions.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

I claim:

1. A roller unit suitable for application to the side walls of chain link conveyors, including along their curved portions, which comprises modules, each of which includes a flat plate, from the opposing sides of which there extends a first pair of brackets between which there are supported the fixing pins of the constituent idle rollers of the roller unit, and a second pair of brackets for receiving the conveyor side wall and the means for fixing the module thereto, said second pair of brackets being provided with recesses which extend to also involve the plate.

2. The roller unit as claimed in claim 1, wherein the means for fixing the module to the side wall consists of pegs inserted into opposing seats provided in said second pair of brackets.

3. The roller unit as claimed in claim 2, wherein said second bracket pair, which are defined by said recesses, houses at least one peg for fixing the roller unit to the side.

4. The roller unit as claimed in claim 1, wherein the plate comprises a line of narrow cross-section which enables it to be deformed, with consequent divergence of the brackets of said first bracket pair.

5. The roller unit as claimed in claim 1, wherein the plate comprises interruptions between the portions involved by the recesses.

6. The roller unit as claimed in claim 1, wherein said first bracket pair comprises equidistant opposing dead cavities for receiving the fixing pins for the idle rollers.

* * * * *